June 27, 1961   H. M. VALENTINE   2,989,983
LOAD CONTROL VALVE FOR VEHICLE AIR SPRINGS
Filed Sept. 13, 1957   2 Sheets-Sheet 1

INVENTOR.
Harry M. Valentine

June 27, 1961    H. M. VALENTINE    2,989,983
LOAD CONTROL VALVE FOR VEHICLE AIR SPRINGS
Filed Sept. 13, 1957    2 Sheets-Sheet 2

INVENTOR.
Harry M. Valentine

United States Patent Office 2,989,983
Patented June 27, 1961

2,989,983
LOAD CONTROL VALVE FOR VEHICLE AIR SPRINGS
Harry M. Valentine, Elyria, Ohio, assignor to Bendix-Westinghouse Automotive Air Brake Company, Elyria, Ohio, a corporation of Delaware
Filed Sept. 13, 1957, Ser. No. 683,812
1 Claim. (Cl. 137—599)

This invention relates to motor vehicle air spring suspension systems and more particularly to an improved control valve mechanism for controlling the leveling action of the vehicle frame in response to changes in load conditions.

Various types of vehicle air spring suspension systems have heretofore been proposed wherein an air cushion, bellows or the like has been utilized between the frame and axle portions and such cushion has been inflated with compressed air to a value sufficient to support the frame a predetermined distance above the axle. Such systems have embodied various types of control devices in order that said predetermined distance between the frame and axle parts may be maintained irrespective of variations in the load conditions of the vehicle. For the most part, such control devices function in accordance with variations in the distance between the sprung and unsprung portions of the vehicle, so that as the vehicle load is increased, and the vehicle frame approaches the axle, the air pressure within the air springs is increased to bring the frame back to its proper level. Similarly, as the vehicle load is decreased and the vehicle frame moves upwardly with respect to the axle, the air pressure within the air springs is exhausted until the frame is returned to its proper level.

One of the important objects of the present invention is to provide a novel control valve mechanism which is inoperative, when the vehicle is stopped, to control the air pressure within the air springs so that the vehicle frame will promptly assume a predetermined level in accordance with the vehicle load conditions, but wherein substantially slight changes in air volume within the air springs will take place when the vehicle is operated over the road, whereby the predetermined level once established when the vehicle is stopped, will be maintained when the vehicle is in motion.

Another object of the invention is to provide a novel control valve mechanism of the foregoing character which includes a leveling valve and a cut-out valve, the latter being interposed between the leveling valve and the air spring and being arranged to restrict to a relatively low rate, the flow of compressed air to and from the air spring when the vehicle doors are closed and to allow relatively free flow of air at a higher rate to and from the air spring when the vehicle doors are opened.

A further object is to provide a novel control valve mechanism of the above type which is operable to conserve the supply of compressed air during over-the-road operation of the vehicle and which comprises relatively few parts.

A still further object is to provide a novel valve control mechanism which will provide a relatively large inflating or deflating flow capacity where the vehicle is stationary and a relatively small flow capacity to or from the spring when the vehicle is in motion. The small capacity is for the purpose of making up any air pressure lost from the springs due to leakage or to compensate for any increase or decrease of load shift while the vehicle is in motion.

Other objects and novel features of the invention will appear more fully hereinafter from a consideration of the following detailed description when taken in connection with the accompanying drawings which are illustrative of one form of the invention. It is to be expressly understood, however, that the drawings are utilized for purposes of illustration only and are not to be taken as a definition of the limits of the invention, reference being had for this purpose to the appended claim.

In the drawings, wherein similar reference characters refer to similar parts throughout the several views.

Figure 1:
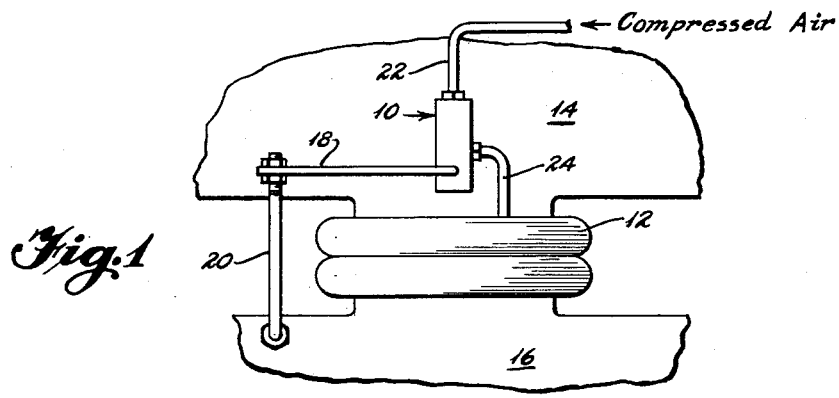
FIG. 1 is a diagrammatic view of the control valve mechanism of the invention associated with an air spring of conventional construction.

Referring more particularly to FIG. 1, the novel control valve mechanism 10 of the present invention is illustrated therein in association with a conventional type of air spring or bellows 12, the valve mechanism being mounted on a portion 14 of the vehicle frame and the air spring being interposed between the frame portion 14 and an axle portion 16. The control valve 10 controls the flow of compressed air to and from the air spring 12 in accordance with variations in the distance between the frame portion 14 and the axle portion 16, operation of the valve being effected by oscillation of a control arm 18, the outer end of which is connected with the axle portion 16 by means of a link 20. It will be understood that the valve mechanism 10 may be used to control air springs on opposite sides of the vehicle or separate control valve mechanisms may be utilized for each air spring, if desired.

As will appear more fully hereinafter, the control valve mechanism 10 functions to control the air pressure within the air spring 12 so that a predetermined distance will be maintained between the frame and axle portions 14 and 16 regardless of variations in loading of the vehicle. Thus, in the static condition of FIG. 1, and assuming a no-load condition of the vehicle, a predetermined air pressure is trapped within the air spring 12 so that the frame portion 14 is maintained a predetermined distance above the axle portion 16. In the event the vehicle load is increased, the portions 14 and 16 will approach each other and the outer end of arm 18 will move upwardly, relatively to the lapped or neutral position of the valve, to actuate the control valve mechanism 10 to supply additional air pressure to the air spring 12 by way of conduits 22 and 24 to finally return the frame part 14 to the position shown. On the other hand, as the vehicle load is decreased, the expansion of the air spring 12 will cause the frame portion 14 to move upwardly with respect to the axle portion 16 and the control arm 18 will move downwardly, relatively to the lapped position of the valve, to actuate the control valve mechanism to exhaust air from the bellows 12 to again allow the frame portion to return to the neutral position shown.

Figure 2:
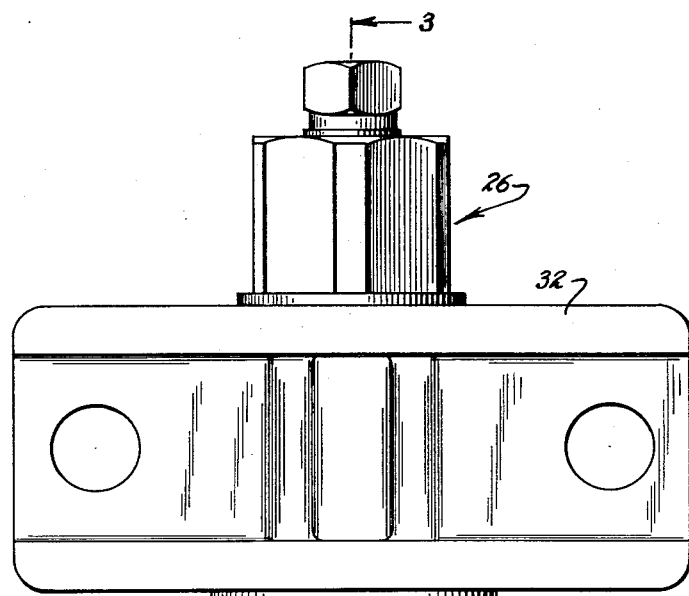
FIG. 2 is a side view of the control valve mechanism, a portion thereof being shown in section.
Figure 2:
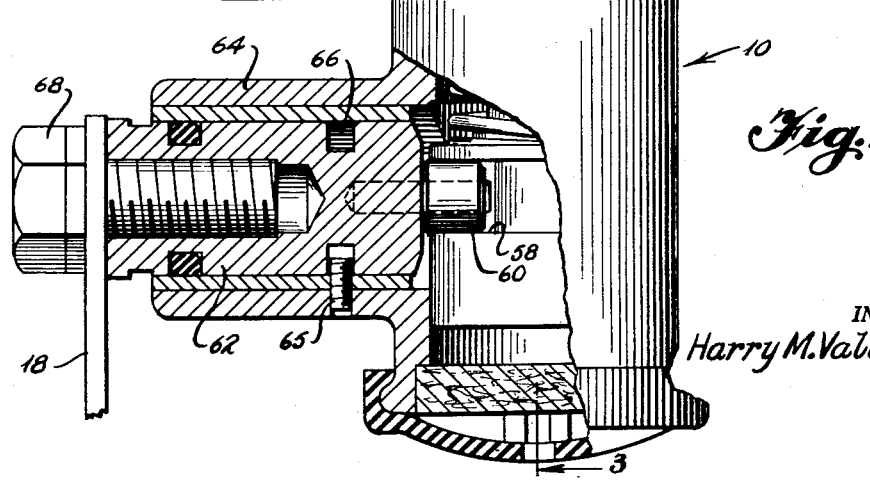
Figure 3:
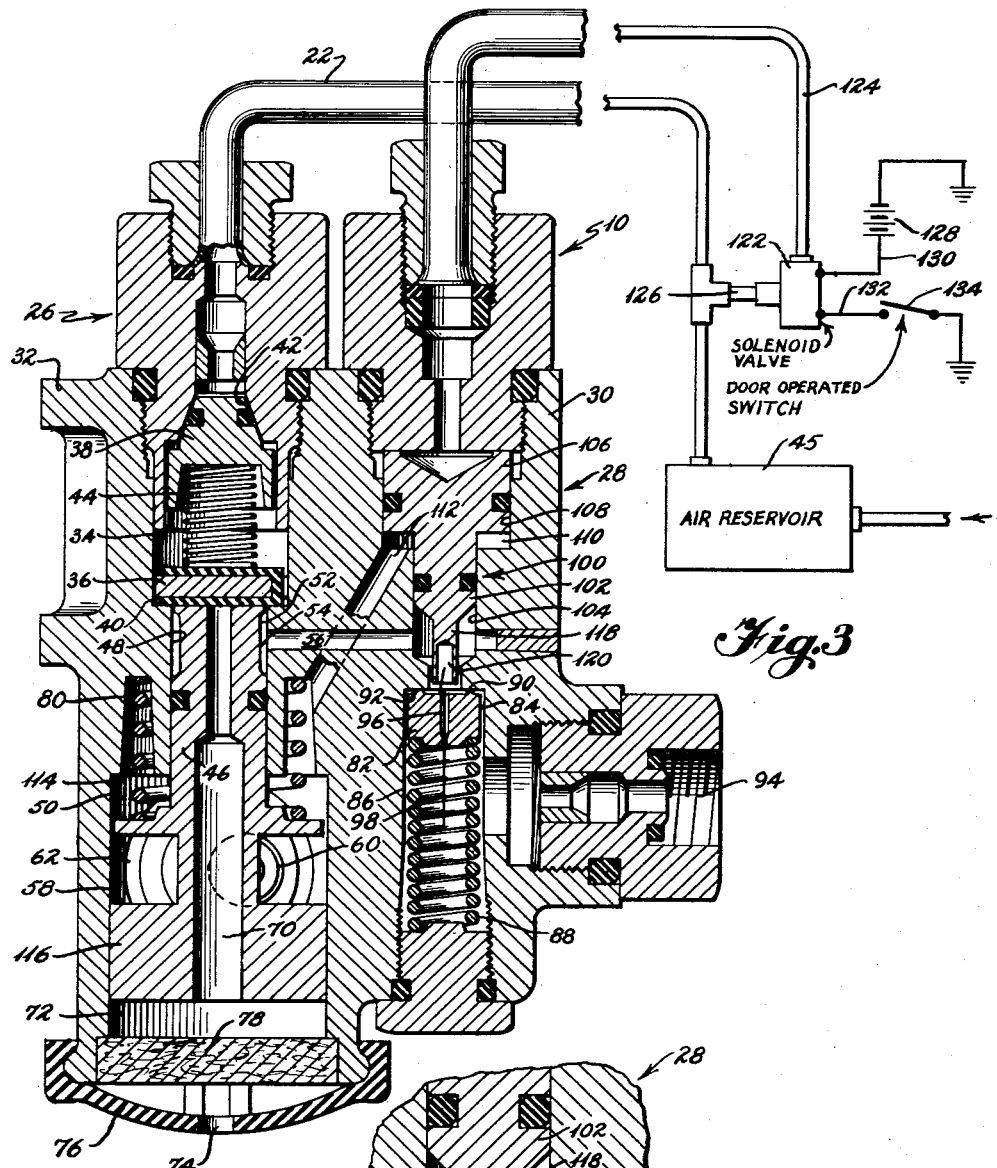
FIG. 3 is a sectional view of the control valve taken along lines 3—3 of FIG. 2, portions of the compressed air control system being shown diagrammatically.

The novel control valve mechanism is more particularly shown in FIGS. 2 and 3 and includes a leveling valve 26 and a cut-out valve 28, both included within a single casing 30 which is provided with a bracket 32 for mounting the valves on a suitable portion of one of the relatively movable members, usually the vehicle frame. The leveling valve 26 includes an inlet chamber 34, a combined inlet and exhaust disk valve 36 and a check valve 38, the latter valves being maintained closed on their respective seats 40 and 42 as by means of a spring 44. Check valve 38 prevents return flow of compressed air to a compressed air reservoir 45 via conduit 22 while the disk valve 36 controls the flow of compressed air to and from the air spring 12 in accordance with variations in the vehicle loading as reflected by movement of the arm 18, as heretofore described. Valves 36 and 38 are provided with clearance about their peripheries, as indicated in FIG. 3 in order to permit air flow to and from the chamber 34. A suitable engine driven compressor, not shown, is utilized to charge the reservoir 45 and to maintain said pressure within predetermined limits.

In order to control the disk valve 36 in accordance with variations in the vehicle loading, an exhaust valve stem 46 is slidably mounted within coaxial bores 48 and 50 in the casing 30, the upper portion of the stem being reduced at 52 to provide an outlet chamber 54 to connect the inlet chamber 34 with an outlet passage 56 when the disk valve 36 is open and to provide an exhaust cavity for the passage 56 when the valve 36 is closed and the stem 46 moves downwardly out of engagement with the valve 36. The lower portion of the stem 46, which is slidably received within the bore 50, is provided with an annular groove 58 for receiving a roller 60, the latter being eccentrically carried at the inner end of an oscillable shaft 62 mounted against endwise movement in a sleeve 64 of the casing 30, as by means of a screw 65 receivable in an annular groove 66 of the shaft 62. The outer end of shaft 62 is fixed to the arm 18 by a screw 68 and from this construction, it will be readily seen that movement of arm 18 in response to vehicle load changes, will oscillate the shaft 62 which in turn, will move the valve stem 46 upwardly or downwardly, as the case may be, through cooperation between the eccentric roller 60 and the groove 58. As shown, the valve stem 46 is provided with a through exhaust bore 70 which communicates at all times with an atmospheric chamber 72, the latter being connected with an atmospheric port 74 in a flexible cap or boot 76 through a suitable air filter 78. It is desired to point out that clearance is provided around the peripheral portion of the upper end of the stem 46 so that chamber 54 will be connected with the bore 70 when the stem 46 moves downwardly out of engagement with valve 36. A light spring 80 is interposed between the stem 46 and the casing, as shown in FIG. 3, in order to ensure contact between roller 60 and the top land of the groove 58.

It will be understood that under a no load condition of the vehicle, the link 20 and arm 18 are so adjusted that the parts of the leveling valve 26 assume the neutral or lapped positions shown in FIG. 3. At this time, sufficient compressed air has been admitted to the outlet passage 56 and to the air spring as to maintain the vehicle frame at a predetermined distance above the vehicle axle. Disk valve 36 is closed upon its seat 40 and the upper end of the valve stem 46 contacts the under side of the valve 36 to interrupt communication between the outlet passage 56 and the atmosphere by way of outlet chamber 54 and bore 70. Any variation of vehicle loading, however, will cause operation of the valve stem 46 to either move the disk valve 36 to open position to connect the inlet chamber 34 with the outlet passage 56, or to withdraw the upper end of the valve stem 46 from the disk valve 36. In the first case, opening of the valve 36 will charge the air springs with compressed air by way of the reservoir 45, conduit 22, chamber 34, open valve 36, chamber 54 and passage 56. In the second case, air pressure within the air springs will be exhausted by way of outlet passage 56, outlet chamber 54, bore 70 and port 74. In either case, the parts will reassume the positions shown in FIG. 3 to cut off air supply or exhaust as soon as the predetermined level of the vehicle frame has been secured.

An important novel feature of the invention resides in the use of the cut-off valve 28 which is interposed between the outlet passage 56 of the leveling valve 26 and the air spring. As will appear more fully hereinafter, such cut-off valve is so arranged as to secure a rapid leveling of the vehicle during vehicle load changes when a vehicle door or doors are opened in order that a proper height control may be achieved when the vehicle is parked and is being loaded or unloaded. Such valve is also so constructed that once the doors of the vehicle are closed, the flow of air to and from the air springs will be considerably restricted and thus the supply of compressed air will not be needlessly wasted during over-the-road operation of the vehicle. It is contemplated that during the latter operation of the vehicle, the restriction of the air supply by the cut-off valve will be such that sufficient air will be available to take care of any slight leakage of air from the air springs.

Figure 4:
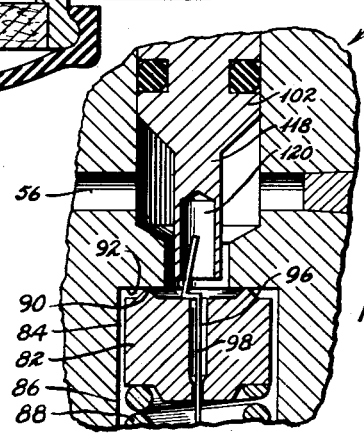
FIG. 4 is an enlarged view in section of a portion of the cut-out valve of FIG. 3.

More particularly, the novel cut-out valve of the invention includes a check valve 82 which is slidably mounted with clearance 84 therearound, in a bore 86, the valve 82 being normally urged by a heavy spring 88 to the position shown where the upper annular portion 90 engages a seat 92 to thus cut off communication between the outlet passage 56 and an air spring outlet port 94 by way of the clearance space 84 around the valve 82. Spring 88 is of sufficient strength to maintain the valve 82 seated with a force sufficient to prevent full reservoir pressure from opening the same. A central bore 96 in the valve, which is restricted by a loosely mounted wire 98 of less diameter than the bore, see FIG. 4, at this time offers restricted communication between port 94 and passage 56, and such restricted flow of compressed air to and from the air spring is effective at all times when the vehicle doors are closed. It will be understood that the wire 98 which is loosely received in the bore 96, not only serves to restrict the bore but also serves to prevent clogging of the bore by dirt due to the jiggling action of the wire during over-the-road operation of the vehicle.

In order to afford substantially unrestricted flow of compressed air to and from the air spring 12 when the vehicle is at rest and is being loaded or unloaded, a piston 100 is mounted in the casing 30 and provided with a lower portion 102 slidable within a bore 104 which is constantly connected with the outlet passage 56. Since the pressure within the passage 56 is always at the same value as the pressure in the air spring 12, it will be seen that the piston portion 102 is always subject to air spring pressure. Integrally connected with the piston portion 102 is an upper piston portion 106 which is mounted within a bore 108. The portion 106 is of larger cross-sectional area than portion 102 and an annular space 110 is thus provided which is constantly connected through a bore 112 with a chamber 114 in the leveling valve 26. Such chamber is maintained at atmospheric pressure at all times since the guide 116 of the exhaust valve stem 46 has a loose fit in the bore 50. The lower piston portion 102 is provided with a reduced end 118 for engaging the check valve 82 to move the same downwardly and off its seat 92 when the piston 106 is moved downwardly, as viewed in FIG. 3. When this occurs, substantially unrestricted communication between the outlet passage and the air spring outlet port is afforded due to the clearance space 84 around the check valve 82. In order to accommodate the upper end of the wire 98, the lower end 118 of the portion 102 is recessed at 120.

Novel means are provided for controlling the application of compressed air to the upper piston portion 106 and in the form shown, such means is manually operated when the vehicle is stationary. More particularly, the upper portion of the bore 108 above the piston portion 106 is connected to a solenoid valve 122 by means of a conduit 124. The valve 122 is of well-known construction wherein conduit 124 is connected through branch conduit 126 with the reservoir conduit 22 whenever the valve is energized. On the other hand, when the valve 122 is de-energized, communication between conduits 126 and 124 is interrupted and the latter conduit is connected with the atmosphere.

As shown, valve 122 is connected with the vehicle battery 128 by connections 130 and 132, a vehicle door controlled switch 134, of well-known construction, being connected in the circuit for energizing the valve 122 whenever a vehicle door is opened. While one switch 134 is shown in FIG. 3, it will be understood that a similar switch is associated with all of the vehicle doors, such switches being connected in parallel so that opening of any door will effect energization of the solenoid valve 122. It will thus be seen that the energization of the valve 122 is manually controlled through the opening and closing movements of any door of the vehicle.

From the foregoing, the operation of the novel control valve mechanism is efficiently controlling the leveling action of the vehicle with changes in load will be readily understood. Assuming that the air springs are charged with compressed air at the no load condition of the vehicle, when the vehicle is parked and any door is opened, the energization of the solenoid valve 122 will cause compressed air to be applied through conduit 124 to the piston portion 106 to move the latter downwardly to open the check valve 82 to establish substantially unrestricted communication between the outlet passage 56 and the air springs by way of the clearance space 84 around valve 82 and the port 94. As the vehicle is loaded, the arm 18 will be moved upwardly, see FIG. 1, to open the disk valve 36 through operation of the shaft 62, eccentric roller 60 and exhaust valve stem 46 to quickly supply additional compressed air to the air springs until such time as the vehicle frame returns to its predetermined level or height distance above the axle. When this occurs, the disk valve 36 will close due to the return of the parts 18 and 60 to the positions shown in FIGS. 1 and 3. Then, when the vehicle doors are closed to de-energize the solenoid valve 122, the exhausting of the conduit 124 will enable the piston to be returned to the position illustrated in FIG. 3, due to the action of air pressure in passage 56 upon the piston portion 102, it being understood that since passage 56 is connected at all times with the air spring, the pressure in said passage will be identical to the air spring pressure. As piston 106 moves upwardly, the check valve 82 will be returned by the spring 88 to the position illustrated where the annular portion 90 thereof closes against the seat 92 to interrupt the substantially unrestricted communication between the passage 56 and the port 94 and reestablish communication to the air spring by way of the restricted bore 96.

It will be understood that in the event the vehicle is being unloaded with a door opened, the operation of the invention will be as above set forth except that the arm 18 will move downwardly to withdraw the exhaust valve stem 46 from the disk valve 36 to quickly reduce the air pressure within the air spring due to the connection of port 94, clearance 84 and passage 56 with the atmospheric port 74 by way of bore 70. Here again, however, the parts will be restored to the positions illustrated with the vehicle frame returned to its proper level, and regardless of the new loading of the vehicle.

During over-the-road operation of the vehicle, the arm 18 will be moved in accordance with road conditions as well as possible leakage of air from the air springs. In any event, the leveling valve 26 will function, as here-heretofore set forth to charge or exhaust the air springs through the restricted bore 96 in the check valve 82 of the cut-out valve 28. Thus, a substantially small amount of air will be used during this phase of vehicle operation.

From the foregoing, it will be readily seen that the present invention provides a novel control valve mechanism for efficiently controlling the leveling action of a vehicle equipped with air springs and regardless of variations in the loading of the vehicle. The cut-out valve 28 affords a dual capacity rate of control of the pressure in the air springs, a substantially high rate of flow being secured when the control piston 106 opens the check valve 82 when a vehicle door is opened, and a substantially low rate of flow through the restricted bore 96 being secured when the piston 106 is moved upwardly and the valve 82 closes upon the seat 92. The movements of the piston 106 in opposite directions are positively effected by the compressed air in the air springs acting upon the smaller area of portion 102 or by the control pressure from conduit 124 acting upon the larger area of the piston portion 106, thus avoiding the use of springs for moving the piston 100 in either direction. The use of the wire 98 in the bore 96 not only serves to provide the proper restriction of the rate of air flow to and from the air springs during over-the-road operation of the vehicle, but also serves to maintain the bore free from clogging due to dust or dirt. The arrangement is such that the supply of compressed air is conserved, during travel of the vehicle, thus enabling the use of a compressor of relatively low capacity for charging the reservoir. While the cut-out valve is preferably controlled by a vehicle door, it will be understood that it may be interlocked with the brake, clutch, throttle or other manually or automatically operated control of the vehicle if desired.

While a preferred form of the invention has been described herein with considerable particularity, it will be understood by those skilled in the art that various modifications may be made therein without departing from the spirit of the invention. Reference will therefore be had to the appended claim for a definition of the limits of the invention.

What is claimed is:

A control valve mechanism for controlling the rate of flow of compressed air in a passage through which said compressed air intermittently flows in opposite directions comprising a check valve in said passage having a restricted bore therethrough and normally occupying one position for restricting the flow of compressed air through said passage and said bore to a predetermined low rate and movable to a second position to increase the rate of flow through said passage, an air pressure operated piston movable into and out of engagement with said check valve for controlling its movement, said piston having a first pressure receiving portion constantly subjected to the pressure of air in said passage so that said piston is normally retained out of engagement with said valve and having a second pressure receiving portion of greater cross-sectional area than said first portion, means for selectively controlling the flow of compressed air to and from said second portion independently of the flow of compressed air in said passage to control the movement of said piston into and out of engagement with said check valve for moving the same between its first and second positions irrespective of the direction of flow of compressed air in said passage, a wire of smaller diameter than said bore freely suspended therein, said wire having a free end projecting beyond said check valve in the direction of the first portion of said piston, and an enlarged recess in the end of said first portion for receiving the free end of said wire.

References Cited in the file of this patent

UNITED STATES PATENTS

| | | |
|---|---|---|
| 1,126,070 | Pasman | Jan. 26, 1915 |
| 1,406,026 | Jensenius | Feb. 7, 1922 |
| 1,948,773 | Shenton | Feb. 27, 1934 |
| 2,101,468 | Dale | Dec. 7, 1937 |
| 2,417,217 | Schreck | Mar. 11, 1947 |
| 2,538,806 | St. Clair | Jan. 23, 1951 |
| 2,687,311 | Nallinger | Aug. 24, 1954 |
| 2,787,475 | Jackson | Apr. 2, 1957 |